(12) United States Patent
Lu et al.

(10) Patent No.: US 11,366,970 B2
(45) Date of Patent: Jun. 21, 2022

(54) SEMANTIC ANALYSIS METHOD AND APPARATUS, AND STORAGE MEDIUM

(71) Applicant: TENCENT TECHNOLOGY (SHENZHEN) COMPANY LIMITED, Shenzhen (CN)

(72) Inventors: Yanan Lu, Shenzhen (CN); Rongyu Cao, Shenzhen (CN); Fen Lin, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 397 days.

(21) Appl. No.: 16/672,121

(22) Filed: Nov. 1, 2019

(65) Prior Publication Data

US 2020/0065389 A1 Feb. 27, 2020

Related U.S. Application Data (63) Continuation of application No. PCT/CN2018/109471, filed on Oct. 9, 2018.

(30) Foreign Application Priority Data

Oct. 10, 2017 (CN) .......................... 201710936211.X (51) Int. Cl.
*G06F 40/30* (2020.01)
*G06F 17/16* (2006.01)
(Continued)

(52) U.S. Cl.
CPC .............. *G06F 40/30* (2020.01); *G06F 17/16* (2013.01); *G06K 9/6257* (2013.01); *G06K 9/6265* (2013.01); *G06N 3/08* (2013.01)

(58) Field of Classification Search
CPC ..... G06F 17/2785; G06F 17/16; G06K 9/6265; G06K 9/6257; G06N 3/08
See application file for complete search history.

(56) References Cited

U.S. PATENT DOCUMENTS 10,388,274 B1* 8/2019 Hoffmeister ......... G06N 3/0445
10,909,871 B2* 2/2021 Cha ........................ G09B 7/06
(Continued)

FOREIGN PATENT DOCUMENTS

CN 106126507 A 11/2016
CN 106649786 A 5/2017
(Continued)

OTHER PUBLICATIONS

The World Intellectual Property Organization (WIPO) International Search Report for PCT/CN2018/109471 dated Jan. 4, 2019 5 Pages (including translation).

*Primary Examiner* — Kevin Ky
(74) *Attorney, Agent, or Firm* — Anova Law Group, PLLC (57) ABSTRACT

A semantic analysis method includes: inputting a word vector of each word in each sample sentence in a dialog flow into an encoder model, to obtain a sentence vector representing semantics of the sample sentence; inputting the sentence vector into a first decoder model corresponding to each context sentence of the sample sentence and a second decoder model corresponding to each word of the sample sentence, to obtain a first identifier corresponding to the context sentence and a second identifier corresponding to the word; obtaining a probability of the first identifier and a probability of the second identifier, and determining a value of a target function; performing parameter training on the encoder model according to the value of the target function; and inputting a word vector of each word in a test sentence (Continued)

into the trained encoder model, to obtain a sentence vector representing semantics of the test sentence.

16 Claims, 8 Drawing Sheets

(51) Int. Cl.
*G06K 9/62* (2022.01)
*G06N 3/08* (2006.01)

(56) References Cited

U.S. PATENT DOCUMENTS

| | | | |
|---|---|---|---|
| 2016/0253596 A1* | 9/2016 | Goth, III | G09B 7/02 |
| | | | 706/12 |
| 2017/0060855 A1* | 3/2017 | Song | G06F 40/55 |
| 2017/0270120 A1* | 9/2017 | Ajmera | G06F 16/24522 |
| 2017/0278510 A1 | 9/2017 | Zhao et al. | |
| 2018/0011843 A1* | 1/2018 | Lee | G06F 40/56 |
| 2018/0046618 A1* | 2/2018 | Lee | G06F 16/3344 |
| 2018/0181673 A1 | 6/2018 | Liu | |
| 2018/0341866 A1* | 11/2018 | Huang | G06N 3/0454 |
| 2018/0365220 A1* | 12/2018 | Chakraborty | G06N 3/0454 |
| 2019/0005090 A1* | 1/2019 | Zhang | G06F 16/3329 |
| 2019/0057081 A1* | 2/2019 | Choi | G06N 3/08 |
| 2019/0371299 A1* | 12/2019 | Jiang | G06N 5/00 |
| 2020/0065389 A1* | 2/2020 | Lu | G06V 30/274 |
| 2020/0193317 A1* | 6/2020 | Cha | G06N 20/00 |
| 2022/0067211 A1* | 3/2022 | Madineni | H04L 51/14 |

FOREIGN PATENT DOCUMENTS

| | | |
|---|---|---|
| CN | 106980683 A | 7/2017 |
| CN | 108509411 A | 9/2018 |

\* cited by examiner

Calculate, when the sample sentence is an $j^{th}$ sentence in an $i^{th}$ group of dialog flows, a value of a first term $v_j^{(i)}$ of the target function according to a probability at which each first decoder model outputs a first identifier $s_{j-q}^{(i)}$ corresponding to a context sentence in response to inputting a sentence vector $$\sum_{i=1}^{N}\sum_{j=1}^{T} p\left(s_{j-Q}^{(i)}, \ldots, s_{j-1}^{(i)}, s_{j+1}^{(i)}, \ldots, s_{j+Q}^{(i)} \mid v_j^{(i)}\right)$$

of the sample sentence, where q=1, 2, ..., Q, N is a total quantity of groups of dialog flows, and T is a total quantity of sentences included in the $i^{th}$ group of dialog flows ~ 201

Calculate a value of a second term $v_j^{(i)}$ of the target function according to a probability at which each second decoder model outputs a second identifier $w_{jk}^{(i)}$ of a corresponding word in the sample sentence in response to inputting the sentence vector $$\sum_{i=1}^{N}\sum_{j=1}^{T}\sum_{k=1}^{M} p\left(w_{jk}^{(i)} \mid v_j^{(i)}\right)$$

of the sample sentence, where M is a total quantity of words in the sample sentence ~ 202

Sum the value of the first term and the value of the second term, to obtain the value of the target function ~ 203

SEMANTIC ANALYSIS METHOD AND APPARATUS, AND STORAGE MEDIUM

RELATED APPLICATIONS

This application is a continuation application of PCT Patent Application No. PCT/CN2018/109471, filed on Oct. 9, 2018, which claims priority to Chinese Patent Application No. 201710936211.X, entitled "SEMANTIC ANALYSIS METHOD AND APPARATUS" filed with National Intellectual Property Administration, PRC on Oct. 10, 2017, which is incorporated by reference in its entirety.

FIELD OF THE TECHNOLOGY

The present disclosure relates to the field of natural language processing technologies and, in particular, to a semantic analysis method and apparatus, and a storage medium.

BACKGROUND

To better perform human-machine interaction, a natural language inputted by a user usually needs to be processed by using a model, to obtain semantics of the user through analysis. The model is often based on a recurrent neural network and, currently, the neural network often has low computation efficiency and the analysis often needs a large amount of time. The disclosed methods and systems are directed to solve one or more problems set forth above and other problems.

SUMMARY

In one aspect of the present disclosure, a semantic analysis method is provided for a computing device. The semantic analysis method includes inputting, for each sample sentence in a dialog flow, a word vector of each word in the sample sentence into an encoder model, to obtain a sentence vector representing semantics of the sample sentence; and inputting the sentence vector of the sample sentence into a first decoder model corresponding to each context sentence of the sample sentence, to obtain a first identifier corresponding to the context sentence. The method also includes inputting the sentence vector of the sample sentence into a second decoder model corresponding to each word of the sample sentence, to obtain a second identifier corresponding to the word; and obtaining a first probability corresponding to the first identifier according to the first decoder models, obtaining a second probability corresponding to the second identifier according to the second decoder models, and determining a value of a target function, the value of the target function being used for indicating that the sentence vector of the sample sentence represents a semantic accuracy degree. Further, the method includes performing parameter training on the encoder model according to the value of the target function; and inputting a word vector of each word in a test sentence into the trained encoder model, to obtain a sentence vector representing semantics of the test sentence.

In another aspect of the present disclosure, a semantic analysis apparatus is provided. The semantic analysis apparatus includes a memory storing computer program instructions; and a processor coupled to the memory. When executing the computer program instructions, the processor is configured to perform: inputting, for each sample sentence in a dialog flow, a word vector of each word in the sample sentence into an encoder model, to obtain a sentence vector representing semantics of the sample sentence; inputting the sentence vector of the sample sentence into a first decoder model corresponding to each context sentence of the sample sentence, to obtain a first identifier corresponding to the context sentence; inputting the sentence vector of the sample sentence into a second decoder model corresponding to each word of the sample sentence, to obtain a second identifier corresponding to the word; obtaining a first probability corresponding to the first identifier according to the first decoder models, obtaining a second probability corresponding to the second identifier according to the second decoder models, and determining a value of a target function, the value of the target function being used for indicating that the sentence vector of the sample sentence represents a semantic accuracy degree; performing parameter training on the encoder model according to the value of the target function; and inputting a word vector of each word in a test sentence into the trained encoder model, to obtain a sentence vector representing semantics of the test sentence.

In another aspect of the present disclosure, a non-transitory computer-readable storage medium is provided. The non-transitory computer-readable storage medium stores computer program instructions executable by at least one processor to perform: inputting, for each sample sentence in a dialog flow, a word vector of each word in the sample sentence into an encoder model, to obtain a sentence vector representing semantics of the sample sentence; inputting the sentence vector of the sample sentence into a first decoder model corresponding to each context sentence of the sample sentence, to obtain a first identifier corresponding to the context sentence; inputting the sentence vector of the sample sentence into a second decoder model corresponding to each word of the sample sentence, to obtain a second identifier corresponding to the word; obtaining a first probability corresponding to the first identifier according to the first decoder models, obtaining a second probability corresponding to the second identifier according to the second decoder models, and determining a value of a target function, the value of the target function being used for indicating that the sentence vector of the sample sentence represents a semantic accuracy degree; performing parameter training on the encoder model according to the value of the target function; and inputting a word vector of each word in a test sentence into the trained encoder model, to obtain a sentence vector representing semantics of the test sentence.

Other aspects of the present disclosure can be understood by those skilled in the art in light of the description, the claims, and the drawings of the present disclosure.

DESCRIPTION OF EMBODIMENTS

The following describes embodiments of the present invention in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain the present disclosure and cannot be construed as any limitation to the present disclosure.

The semantic analysis method and apparatus in the embodiments of the present disclosure are described below with reference to the accompanying drawings.

In real applications, a recurrent neural network is usually used as an encoder/decoder of a model, and semantic analysis is performed on a to-be-analyzed sentence. When the model is trained, serial computing processes are required because an encoder of a neural network is used. For example, when a length of a sentence received by the encoder is m, calculation of m-times steps is needed. In addition, it is assumed that the to-be-analyzed sentence received at a decoder has 2k context sentences, and a largest length of the context sentences is n. Because 2k decoders may operate in parallel, but each decoder needs to process the context sentences in parallel, calculation of n-times steps is needed. Therefore, for one sentence, a whole calculation process needs (m+n)-times steps.

Therefore, when a sentence has a large length or the number of sentences is large, model training time is long, and semantic analysis efficiency is low.

In an artificial intelligence technology, to make a chatting robot accurately understand semantics of the user and implement better human-machine interaction, a large amount of training data usually needs to be used to train sentence semantic representation based on a model.

In a related technology, sentence semantic representation is usually trained by using a skip-thought model. The model is an encoder-decoder model based on a recurrent neural network. Because an encoder and a decoder both use the recurrent neural network, and the recurrent neural network cannot perform execution in parallel, computing efficiency is low, and execution time and a sentence length are in a linear relationship, that is, when a sentence has a large length, and a data volume of training data is large, training time is long. As a result, when sentence semantic representation is trained using the skip-thought model, long training time is needed to obtain a good training result.

Accordingly, the embodiments of the present disclosure provide an improved semantic analysis method, to shorten a training time length and improve processing efficiency.

Figure 1A:
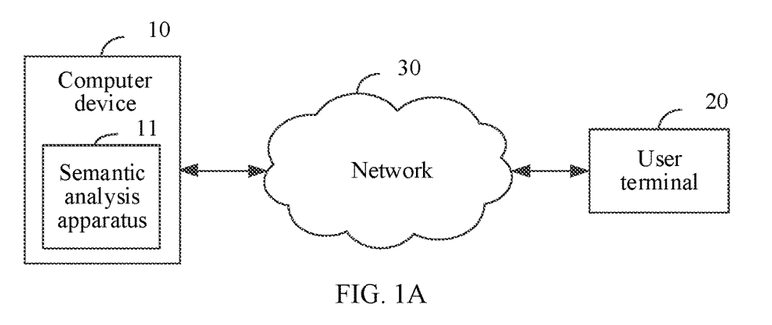
FIG. 1A is a schematic diagram of an implementation environment of a semantic analysis method according to an embodiment of the present disclosure.

FIG. 1A is a schematic diagram of an implementation environment of a semantic analysis method according to an embodiment of the present disclosure. A computer device 10 is integrated with a semantic analysis apparatus 11 provided by embodiments of the present disclosure, and the semantic analysis apparatus 11 is configured to implement a semantic analysis method provided by any embodiment of the present disclosure. The computer device 10 and a user terminal 20 are connected through a network 30, and the network 30 may be a wired network or a wireless network.

Figure 1B:
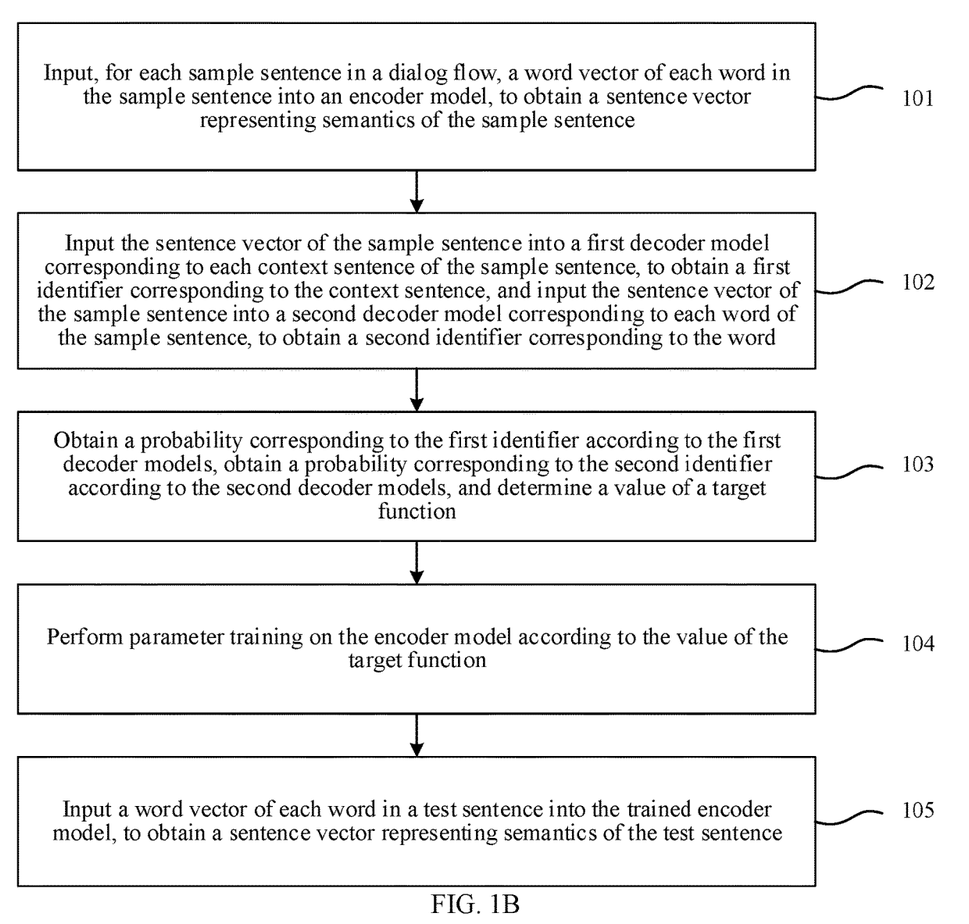
FIG. 1B is a schematic flowchart of a semantic analysis method according to an embodiment of the present disclosure.

FIG. 1B is a schematic flowchart of a semantic analysis method according to an embodiment of the present disclosure. As shown in FIG. 1B, the semantic analysis method may be applied to a computer device and include the followings.

Step 101: For each sample sentence in a dialog flow, input a word vector of each word in the sample sentence into an encoder model, to obtain a sentence vector representing semantics of the sample sentence.

When sentence semantic representation is trained, a data set used during training is a natural dialog data set. The natural dialog data set includes a plurality of groups of dialog flows. Each group of dialog flows includes alternating dialogs of two users. An $i^{th}$ group of dialog flows is represented as $s_1^{(i)}, s_2^{(i)}, \ldots, s_T^{(i)}$. $s_j^{(i)}$ represents a $j^{th}$ sentence in the $i^{th}$ group of dialog flows. T represents a number of sentences included in the $i^{th}$ group of dialog flows. For the $j^{th}$ sentence in the $i^{th}$ group of dialog flows, the sentence includes a plurality of words. The words may be respectively represented as $w_{j1}^{(i)}, w_{j2}^{(i)}, \ldots, w_{jM}^{(i)}$. $w_{jr}^{(i)}$ represents an $r^{th}$ word in the $j^{th}$ sentence in the $i^{th}$ group of dialog flows. M represents a number of words included in the $j^{th}$ sentence in the $i^{th}$ group of dialog flows.

For a plurality of sentences in a group of dialog flows, each sentence may be used as a sample sentence. Each sample sentence has a plurality of corresponding context sentences. In one embodiment, for each sample sentence in the dialog flow, a word vector of each word in the sample sentence may be inputted into the encoder model. An output result of the encoder model is a sentence vector representing semantics of the sample sentence.

Step 102: Input the sentence vector of the sample sentence into a first decoder model corresponding to each context sentence of the sample sentence, to obtain a first identifier corresponding to the context sentence, and input the sentence vector of the sample sentence into a second decoder model corresponding to each word of the sample sentence, to obtain a second identifier corresponding to the word.

For each sentence in a group of dialog flows, semantic representation of the sentence decides context sentences of the sentence and all words in the sentence. The words may include words in a specific language or in a number of languages. For example, in Chinese, a sentence of three Chinese words "我吃了" ("I ate") is usually used as an answer to a question sentence in 5 words "你吃饭了吗?" ("Did you eat?"). Therefore, semantic representation of the sentence "我吃了" is strongly related to "你吃饭了吗?", and three words "我" ("I"), "吃" ("eat"), and "了" ("done") together compose semantic representation of the sentence. To improve the calculation speed, in one embodiment, only a sentence identifier of the context sentence is used as context information of the sentence, and an identifier of the word is used as each word in the sentence. When a data volume is large, because there are many repeated sentence identifiers, an information amount included in the sentence identifiers is sufficient to represent context information.

The identifier of the sentence is unique, and each context sentence uniquely corresponds to an identifier of the sentence. Correspondingly, context sentences of a sample sentence may be uniquely determined according to an identifier of a sentence. The identifier of the word is also unique, and the word in the sentence may be uniquely determined according to the identifier of the word.

For a plurality of context sentences of the sample sentence, a corresponding first decoder model is set for each context sentence, and a sentence vector of a sample sentence outputted by the encoder is inputted into a first decoder model corresponding to each context sentence, to obtain a first identifier of the corresponding context sentence.

For each word in the sample sentence, a corresponding second decoder model is set for each word, and a sentence vector of a sample sentence outputted by the encoder is inputted into a second decoder model corresponding to each word, to obtain a second identifier corresponding to each word of the sample sentence.

Step 103: Obtain a probability corresponding to the first identifier according to the first decoder models, obtain a probability corresponding to the second identifier according to the second decoder models, and determine a value of a target function.

The target function may be a likelihood probability function, used for monitoring accuracy of a training process and evaluating a model training effect. The value of the target function is used for indicating that the sentence vector of the sample sentence represents a semantic accuracy degree. A larger value of the target function indicates a more accurate training result and a better training effect.

In one embodiment, the sentence vector of the sample sentence is inputted into the first decoder models and the second decoder models, to respectively obtain the probability corresponding to the first identifier and the probability corresponding to the second identifier as well as obtaining the first identifier corresponding to the context sentence and the second identifier corresponding to the word in the sample sentence, to determine the value of the target function by using the probability corresponding to the first identifier and the probability corresponding to the second identifier.

A specific process of obtaining the probability corresponding to the first identifier according to the first decoder models, obtaining the probability corresponding to the second identifier according to the second decoder models, and determining the value of the target function is provided in subsequent content. To avoid repetition, details are not described herein again.

Step 104: Perform parameter training on the encoder model according to the value of the target function.

As stated above, a larger value of the target function indicates a more accurate model training result. Therefore, in one embodiment, maximizing the target function may be used as a target, and parameter training is performed on the encoder model according to the value of the target function.

In some embodiments of the present disclosure, parameters of models may be trained by maximizing the target function by using a gradient descent method.

Specifically, a process of performing parameter training on the encoder model may be described as: (a), initial values are set for parameters of the model, and the sentence vector of the sample sentence is inputted into the decoders under initial parameters, to obtain the first identifier of the corresponding sentence and the second identifier of the word. The probability of the first identifier and the probability of the second identifier are obtained, and the value of the target function is determined according to the probability of the first identifier and the probability of the second identifier and whether the value of the target function is maximized is also determined. (b), if the value of the target function is not maximized, parameters of the model are adjusted, the value of the target function is re-calculated according to the probability of the first identifier and the probability of the second identifier, and whether a new value of the target function is maximized. The step (b) is repeatedly performed until the value of the target function is maximized. Therefore, parameter values in this case are optimal parameter values of the model and are used as a final parameter result obtained through training.

Step 105: Input a word vector of each word in a test sentence into the trained encoder model, to obtain a sentence vector representing semantics of the test sentence.

In one embodiment, after parameter training is performed on the encoder model according to the value of the target function to obtain parameters of the encoder model, the obtained parameter values are applied to the encoder model to obtain the trained encoder model. Based on the trained encoder model, for any sentence (referred to as a test sentence), a word vector of each word in the test sentence is inputted to the trained encoder model, to accurately obtain a sentence vector representing semantics of the test sentence and lay a foundation for a chatting robot to accurately output a matching answer sentence.

In the semantic analysis method in one embodiment, for the sample sentence in a dialog flow, a word vector of each word in the sample sentence is inputted into an encoder model, to obtain a sentence vector representing semantics of the sample sentence; then the sentence vector of the sample sentence is inputted into a first decoder model corresponding to each context sentence, to obtain a first identifier corresponding to the context sentence; the sentence vector of the sample sentence is inputted into a second decoder model corresponding to each word of the sample sentence, to obtain a second identifier corresponding to the word; a probability corresponding to the first identifier is obtained according to the first decoder models, a probability corresponding to the second identifier is obtained according to the second decoder models, and a value of a target function is determined; then parameter training is performed on the encoder model according to the value of the target function; and a word vector of each word in a test sentence is inputted into the trained encoder model, to obtain a sentence vector representing semantics of the test sentence. Because in a training process, the first decoder model is used for predicting an identifier of the context sentence, only a calculation time length of a time step is needed. Compared with a manner in which each word in the sentence needs to be predicted, in a training process, the needed calculation time-length is shortened, and time steps in the number of sentence lengths are shortened to one time step, resolving the technical problem of low semantic analysis efficiency caused by a long model training time length.

Figure 2:
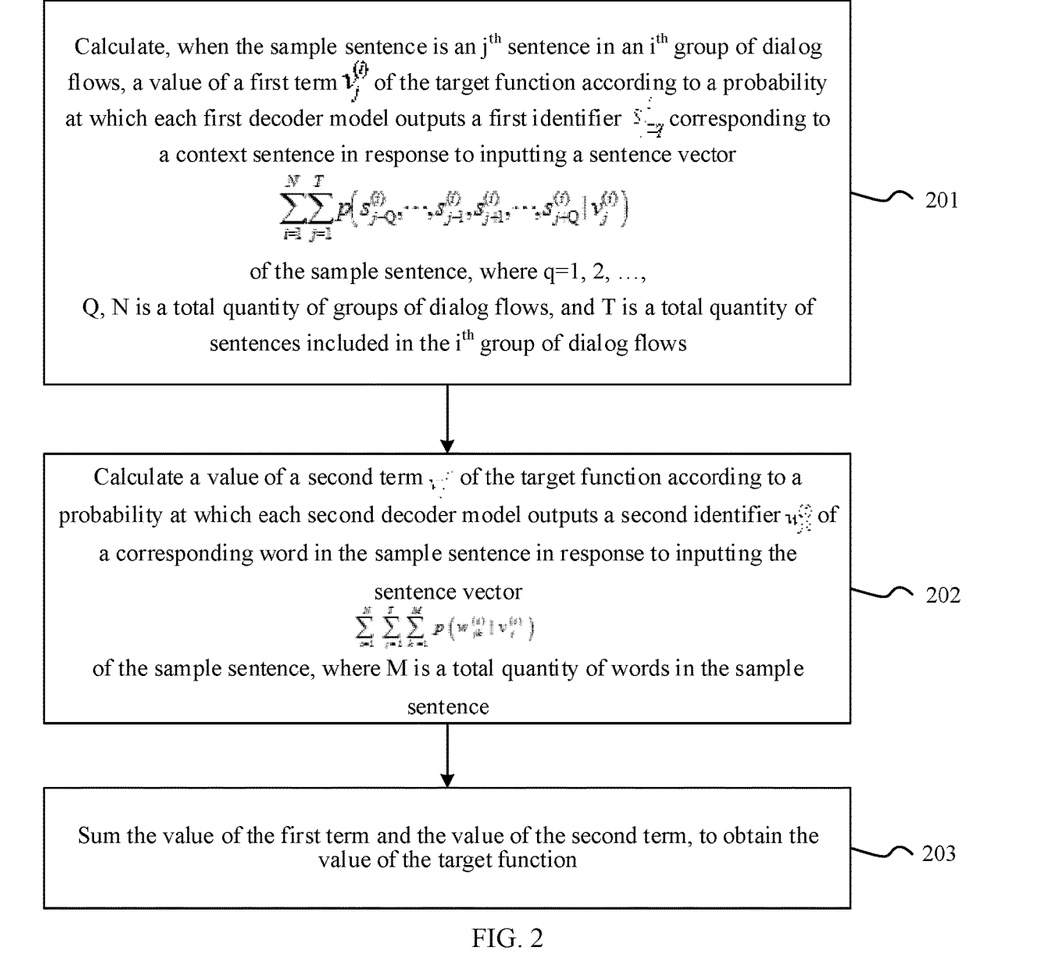
FIG. 2 is a schematic flowchart of another semantic analysis method according to an embodiment of the present disclosure.

To more clearly describe a specific implementation process of generating the target function according to the sentence vector of the sample sentence, an identifier of each word of the sample sentence, and an identifier of each context sentence, the embodiments of the present disclosure further provide another semantic analysis method. FIG. 2 is a schematic flowchart of another semantic analysis method according to an embodiment of the present disclosure. As shown in FIG. 2, based on the embodiment shown in FIG. 1B, step 103 may include the followings.

Step 201: Calculate, when the sample sentence is an $j^{th}$ sentence in an $i^{th}$ group of dialog flows, a value of a first term $v_j^{(i)}$ of the target function according to a probability at which each first decoder model outputs a first identifier $s_{j\pm q}^{(i)}$ corresponding to a context sentence in response to inputting a sentence vector $$\sum_{i=1}^{N}\sum_{j=1}^{T} p(s_{j-Q}^{(i)}, \ldots, s_{j-1}^{(i)}, s_{j+1}^{(i)}, \ldots, s_{j+Q}^{(i)} | v_j^{(i)})$$

of the sample sentence, where q=1, 2, ..., Q, N is a total number of groups of dialog flows, and T is a total number of sentences included in the $i^{th}$ group of dialog flows.

Step 202: Calculate a value of a second term $v_j^{(i)}$ of the target function according to a probability at which each second decoder model outputs a second identifier $w_{jk}^{(i)}$ of a corresponding word in the sample sentence in response to inputting the sentence vector $$\sum_{i=1}^{N}\sum_{j=1}^{T}\sum_{k=1}^{M} p(w_{jk}^{(i)} | v_j^{(i)})$$

of the sample sentence, where M is a total number of words in the sample sentence.

Step 203: Sum the value of the first term of the target function and the value of the second term of the target function, to obtain the value of the target function.

In one embodiment, after the sentence vector of the sample sentence is inputted into the first decoder model and the second decoder model, a probability of a first identifier $s_{j\pm q}^{(i)}$ of each corresponding context sentence and a probability of a second identifier $w_{jk}^{(i)}$ of each word in the sample sentence may be obtained. Further, the obtained probability of the first identifier of each context sentence and the obtained probability of the second identifier of each word in the sample sentence are used to obtain the value of the first term $$\sum_{i=1}^{N}\sum_{j=1}^{T} p(s_{j-Q}^{(i)}, \ldots, s_{j-1}^{(i)}, s_{j+1}^{(i)}, \ldots, s_{j+Q}^{(i)} | v_j^{(i)})$$

of the target function and the value of the second term $$\sum_{i=1}^{N}\sum_{j=1}^{T}\sum_{k=1}^{M} p(w_{jk}^{(i)} | v_j^{(i)})$$

of the target function. Finally, the obtained value of the first term and the obtained value of the second term are summed, to obtain the value of the target function. The target function $f(j)$ may be represented as the following formula (1):

$$f(j) = \sum_{i=1}^{N}\sum_{j=1}^{T} p(s_{j-Q}^{(i)}, \ldots, s_{j-1}^{(i)}, s_{j+1}^{(i)}, \ldots, s_{j+Q}^{(i)} | v_j^{(i)}) + \sum_{i=1}^{N}\sum_{j=1}^{T}\sum_{k=1}^{M} p(w_{jk}^{(i)} | v_j^{(i)}) \quad (1)$$

In the semantic analysis method in one embodiment, the probability corresponding to the first identifier is obtained according to the first decoder models, the probability corresponding to the second identifier is obtained according to the second decoder models, and the value of the target function is determined, to lower computing complexity.

Figure 3:
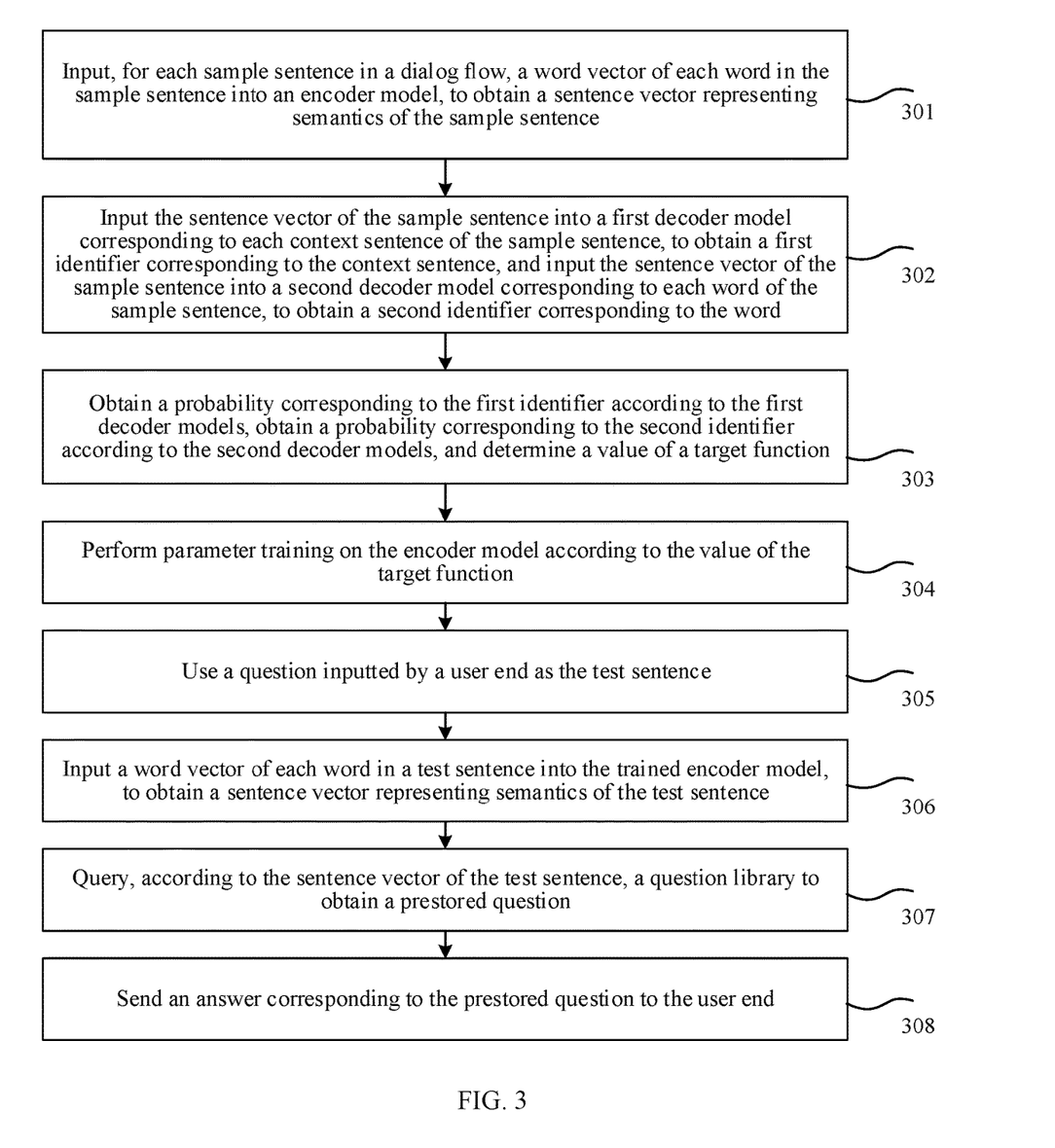
FIG. 3 is a schematic flowchart of another semantic analysis method according to an embodiment of the present disclosure.

To more clearly describe the foregoing embodiment, the embodiments of the present disclosure further provide another semantic analysis method. FIG. 3 is a schematic flowchart of still another semantic analysis method according to an embodiment of the present disclosure. As shown in FIG. 3, the semantic analysis method may be applied to a computer device and include the followings.

Step 301: Input, for each sample sentence in a dialog flow, a word vector of each word in the sample sentence into an encoder model, to obtain a sentence vector representing semantics of the sample sentence.

In some embodiments of the present disclosure, the encoder model may be a convolutional neural network model. For each sample sentence in the dialog flow, the word vector of each word in the sample sentence is inputted into the convolutional neural network model, to obtain a sentence vector of a sample sentence that is outputted by a last layer in the convolutional neural network.

Specifically, when the sample sentence is the $j^{th}$ sentence in the $i^{th}$ group of dialog flows, the word vector of the $k^{th}$ word of the sample sentence may be represented as $w_{jk}^{(i)} \cdot E_{encoder}$ where $w_{jk}^{(i)}$ is an identifier of the $k^{th}$ word of the sample sentence, and $E_{encoder}$ is a word vector matrix of the convolutional neural network model. the word vector of each word in the sample sentence is inputted into the convolutional neural network model, to obtain a sentence vector $v_j^{(i)}$ representing semantics of the sample sentence.

A size of a convolution kernel (that is, a filter) in the convolutional neural network is t*t (usually, t is 3). Because convolution kernels in the convolutional neural network may perform parallel calculation, calculation time length oft time steps are needed. Compared with that the encoder needs calculation time lengths of time steps in the number of sentence lengths to perform serial calculation in the related technology, the processing time length of the encoder is shortened.

Step 302: Input the sentence vector of the sample sentence into a first decoder model corresponding to each context sentence of the sample sentence, to obtain a first identifier corresponding to the context sentence, and input the sentence vector of the sample sentence into a second decoder model corresponding to each word of the sample sentence, to obtain a second identifier corresponding to the word.

Step 303: Obtain a probability corresponding to the first identifier according to the first decoder models, obtain a probability corresponding to the second identifier according to the second decoder models, and determine a value of a target function.

For descriptions of Step 302 and Step 303 in one embodiment, refer to above descriptions of Step 102 and Step 103, which may have a similar implementation principle. Details are not repeated herein.

Step 304: Perform parameter training on the encoder model according to the value of the target function.

In some embodiments of the present disclosure, the encoder model uses a convolutional neural network model, and the first decoder model and the second decoder model both use a deep neural network model. Therefore, when parameter training is performed on the encoder model according to the value of the target function, parameter training is mainly performed on a word vector matrix of the convolutional neural network model, a weight matrix of the convolutional neural network, and a bias vector of the convolutional neural network according to the value of the target function. Further, parameter training is performed on a weight matrix of the deep neural network model and a bias vector of the deep neural network model in the first decoder model and the second decoder model according to the value of the target function.

Because the deep neural network model and the convolutional neural network model are network models well known to a person skilled in the art, to avoid repeated descriptions, one embodiment of the present disclosure does not specifically describe principles of the convolutional neural network model and the deep neural network model.

Figure 4:
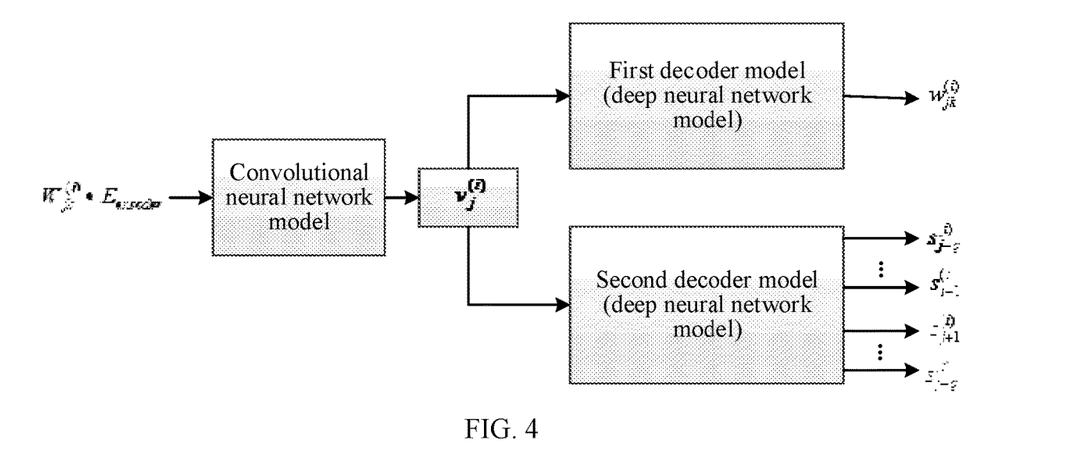
FIG. 4 is a schematic structural diagram of an encoder-decoder model used in an embodiment of the present disclosure.

FIG. 4 is a schematic structural diagram of an encoder-decoder model used in an embodiment of the present disclosure. As shown in FIG. 4, after a word vector $w_{jk}^{(i)} \cdot E_{encoder}$ of each word in any sample sentence in the dialog flow is inputted into the convolutional neural network model, a sentence vector $v_j^{(i)}$ of the sample sentence is outputted. Then the sentence vector $v_j^{(i)}$ of the sample sentence is inputted into the first decoder model and the second decoder model (the first decoder model and the second decoder model both use the deep neural network model), to obtain a second identifier $w_{jk}^{(i)}$ of each word in the sample sentence and first identifiers $s_{j-q}^{(i)}$, $s_{j-1}^{(i)}$, $s_{j+1}^{(i)}$, $s_{j+q}^{(i)}$, and the like of a sentence corresponding to a context sentence of the sample sentence. A value of the second identifier $w_{jk}^{(i)}$ of each word and a value of the first identifier $s_{j\pm q}^{(i)}$ of each context sentence are both used as monitoring information to calculate the value of the target function, to monitor and evaluate a model training effect.

Because the first decoder models and the second decoder models using the deep neural network model can perform parallel calculation with each other, and each second decoder model only predicts an identifier of the sentence, the second decoder model needs only a calculation time length of a time step. Therefore, for any sentence in each group of dialog flows, the encoder-decoder model shown in FIG. 4 only needs calculation time lengths of (t+1) time steps, where t is a size of the convolution kernel of the convolutional neural network model. Compared with calculation time lengths of time steps of (a length of the sample sentence+a largest sentence length in the context sentence) in the related technology, the processing time length is shortened, especially when the sentence length and the number of sentences are both large, thereby improving the processing speed, shortening the processing time, and improving the processing efficiency.

Step 305: Use a question sentence inputted by a user end as the test sentence.

In some embodiments of the present disclosure, the user end may be a user terminal.

Step 306: Input a word vector of each word in a test sentence into the trained encoder model, to obtain a sentence vector representing semantics of the test sentence.

In one embodiment, after parameter training of the model is completed, when a user wants to have a dialog with a chatting robot, a question inputted by the user end may be used as the test sentence. For example, when the user enters "Have you had dinner?", the sentence "Have you had dinner?" is used as the test sentence, and a word vector of each word in the test sentence is inputted into the trained encoder model, to obtain a sentence vector representing semantics of the test sentence.

Step 307: Query, according to the sentence vector of the test sentence, a question library to obtain a prestored question.

In one embodiment, after the sentence vector of the test sentence is obtained based on the trained encoder model, a pre-established question library may be further searched for a prestored question whose semantics is the same as or similar to that of the sentence vector of the test sentence, to obtain a corresponding answer based on the prestored question.

The question library is pre-established, and the question library may be established according to the obtained large number of dialog flows, and an answer corresponding to the prestored question is obtained from the dialog flow and stored in the question library or a corresponding answer library.

Step 308: Send an answer corresponding to the prestored question to the user end.

In one embodiment, when a prestored question similar to the sentence vector of the test sentence is matched from the question library, an answer corresponding to the prestored question is further obtained and sent to the user end. Further, when a plurality of answers corresponding to the prestored question is obtained, an answer may be randomly selected from the plurality of answers and sent to the user end. When a prestored question similar to the sentence vector is not matched from the question library, a corresponding answer may be generated after semantic analysis by using a related technology and sent to the user end.

In the semantic analysis method, in one embodiment, the convolutional neural network model is used as the encoder model, and the deep neural network model is used as the first decoder model and the second decoder model. Because convolution kernels in the convolutional neural network model may perform parallel calculation, the first decoder models and the second decoder models may also perform parallel calculation with each other, to greatly improve a processing speed, shorten processing time, and improve processing efficiency. The question inputted by the user end is inputted into the encoder model as the test sentence, to obtain the sentence vector of the test sentence, and the prestored question similar to the sentence vector is obtained through query from the question library based on the sentence vector, and the answer corresponding to the prestored question is sent to the user end, thereby improving a matching degree between the answer and the question in a human-machine interaction process and improving user experience.

Figure 5:
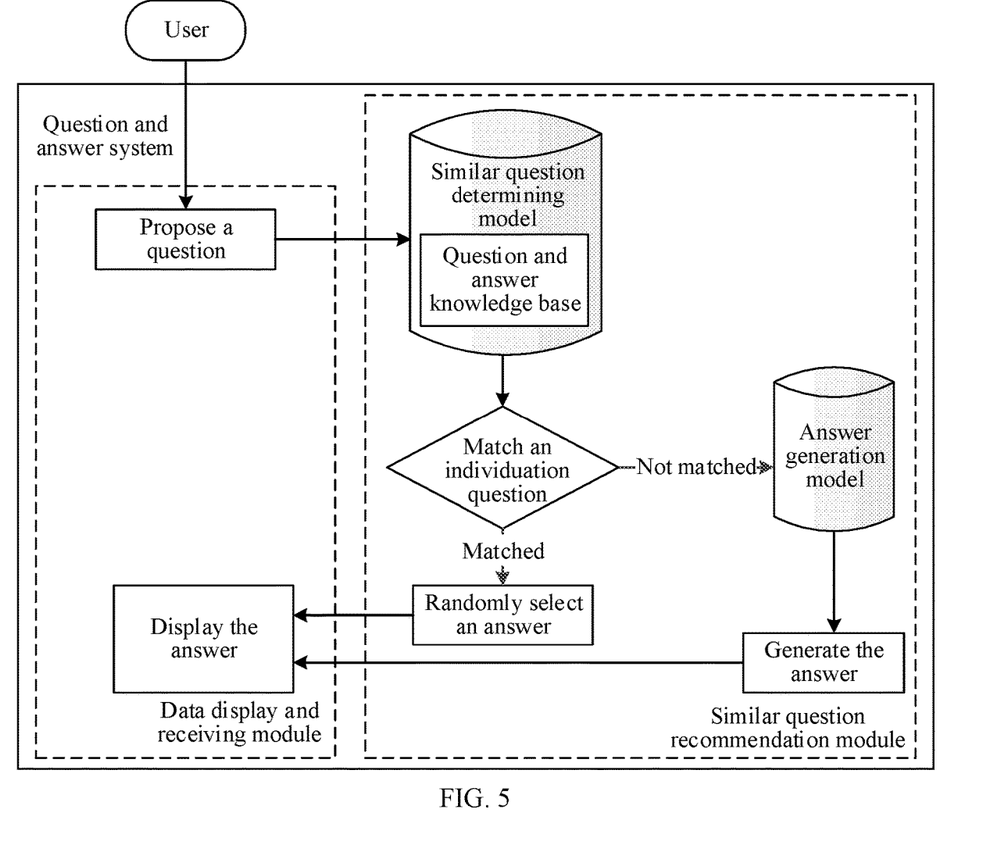
FIG. 5 is a schematic diagram of a question and answer system to which a semantic analysis method in the embodiments of the present disclosure is applied.

FIG. 5 is a schematic diagram of a question and answer system to which a semantic analysis method in the embodiments of the present disclosure is applied. As shown in FIG. 5, the question and answer system includes a data display and receiving module and a similar question recommendation module. The similar question recommendation module includes a similar question determining model. The similar question determining model includes a question and answer knowledge base. The question and answer knowledge base is pre-established. After a large number of dialog flows are analyzed, several question-answer pairs are extracted from the dialog flows, to compose the question and answer knowledge base. For individuation questions, such as "Question: how old are you? Answer: I am 18 this year." and "Question: have you had your dinner? Answer: tonight's pork stewed in soy sauce is delicious.", The user may use various query manners. However, regardless of the query manner, a semantic meaning represented by the question is the same. Based on the semantic analysis method in one embodiment of the present disclosure, for questions in different query manners, different questions are inputted into the trained encoding model, to obtain a sentence vector representing same or similar semantics.

As shown in FIG. 5, when the user proposes a question to the question and answer system, the question proposed by the user is displayed in the data display and receiving module and is inputted into the similar question determining model. The similar question determining model may first perform the semantic analysis method in the embodiments of the present disclosure, to obtain a sentence vector representing semantics of the question proposed by the user, and analyze similarity between the question proposed by the user and a question in the pre-established question and answer knowledge base, to match an individuation question having same or similar semantics for the question proposed by the user.

When there is an individuation question in the question and answer knowledge base whose similarity with the question proposed by the user is higher than a preset threshold, the similar question determining model determines that an actual intention of the user is to query the individuation question. Further, the similar question recommendation module randomly selects an answer from at least one answer corresponding to the individuation question according to the matched individuation question, and sends the answer to the data display and receiving module, and the data display and receiving module displays the answer to the user.

It can be seen from FIG. 5 that the similar question recommendation module further includes an answer generation model, configured to generate, based on the answer generation model, an answer corresponding to the question proposed by the user when an individuation question having same or similar semantics with the question proposed by the user is not matched from the question and answer knowledge base, and feed back the generated answer to the data display and receiving module, to display the answer to the user.

To implement the foregoing embodiments, the embodiments of the present disclosure further provide a semantic analysis apparatus.

Figure 6:
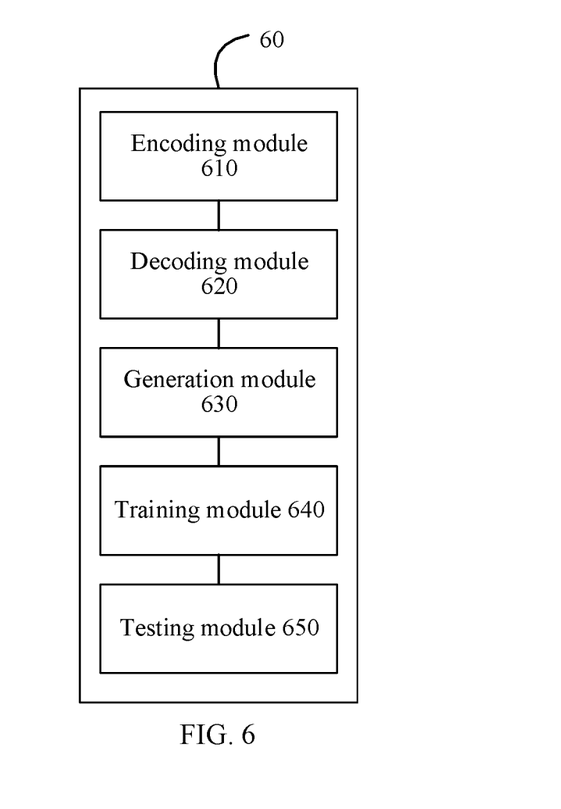
FIG. 6 is a schematic structural diagram of a semantic analysis apparatus according to an embodiment of the present disclosure.

FIG. 6 is a schematic structural diagram of a semantic analysis apparatus according to an embodiment of the present disclosure. As shown in FIG. 6, the semantic analysis apparatus 60 includes an encoding module 610, a decoding module 620, a generation module 630, a training module 640, and a testing module 650.

The encoding module 610 is configured to input, for each sample sentence in a dialog flow, a word vector of each word in the sample sentence into an encoder model, to obtain a sentence vector representing semantics of the sample sentence.

The decoding module 620 is configured to input the sentence vector of the sample sentence into a first decoder model corresponding to each context sentence of the sample sentence, to obtain a first identifier corresponding to the context sentence, and input the sentence vector of the sample sentence into a second decoder model corresponding to each word of the sample sentence, to obtain a second identifier corresponding to the word.

The generation module 630 is configured to obtain a probability corresponding to the first identifier according to the first decoder models, obtain a probability corresponding to the second identifier according to the second decoder models, and determine a value of a target function, the value of the target function being used for indicating that the sentence vector of the sample sentence represents a semantic accuracy degree.

The training module 640 is configured to perform parameter training on the encoder model according to the value of the target function.

The testing module 650 is configured to input a word vector of each word in a test sentence into the trained encoder model, to obtain a sentence vector representing semantics of the test sentence.

Further, in some embodiments of the present disclosure, the encoder model may use a convolutional neural network model, and the first decoder model and the second decoder model both use a deep neural network model. When the encoder model uses a convolutional neural network model, the encoding module 610 is specifically configured to input the word vector of each word in the sample sentence into the convolutional neural network model, to obtain a sentence vector of a sample sentence that is outputted by a last layer in the convolutional neural network model.

Specifically, for the $i^{th}$ group of dialog flows, when the sample sentence is the $j^{th}$ sentence in the $i^{th}$ group of dialog flows, the word vector of the $k^{th}$ word of the sample sentence may be represented as $w_{jk}^{(i)} \cdot E_{encoder}$, where $w_{jk}^{(i)}$ is an identifier of the $k^{th}$ word of the sample sentence, and $E_{encoder}$ is a word vector matrix of the convolutional neural network model. The word vector of each word in the sample sentence is inputted into the convolutional neural network model, to obtain a sentence vector $v_j^{(i)}$ representing semantics of the sample sentence.

When the first decoder model and the second decoder model both use a deep neural network model, the training module 640 is specifically configured to perform parameter training on a word vector matrix of the convolutional neural network model, a weight matrix of the convolutional neural network model, and a bias vector of the convolutional neural network model in the encoder model according to the value of the target function; and perform parameter training on a weight matrix of the deep neural network model and a bias vector of the deep neural network model in the first decoder model and the second decoder model according to the value of the target function.

Figure 7:
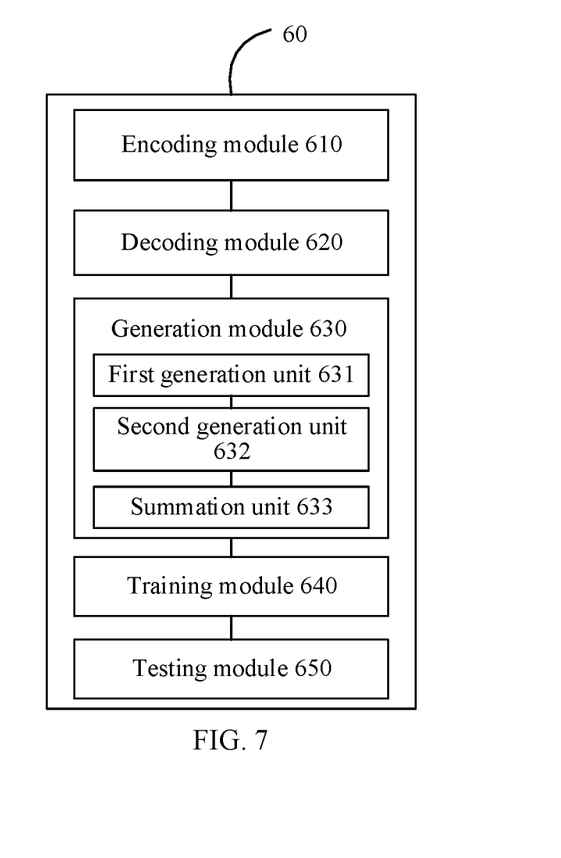
FIG. 7 is a schematic structural diagram of another semantic analysis apparatus according to an embodiment of the present disclosure.

Further to FIG. 6, in some embodiments of the present disclosure, as shown in FIG. 7, the generation module 630 may include a first generation unit 631, a second generation unit 632, and a summation unit 633.

The first generation unit 631 is configured to calculate, when the sample sentence is an $j^{th}$ sentence in an $i^{th}$ group of dialog flows, a value of a first term $v_j^{(i)}$ of the target function according to a probability at which each first decoder model outputs a first identifier $s_{j\pm q}^{(i)}$ corresponding to a context sentence in response to inputting a sentence vector $$\sum_{i=1}^{N}\sum_{j=1}^{T} p(s_{j-Q}^{(i)}, \ldots, s_{j-1}^{(i)}, s_{j+1}^{(i)}, \ldots, s_{j+Q}^{(i)} \mid v_j^{(i)})$$

of the sample sentence, where q=1, 2, . . . , Q, N is a total number of groups of dialog flows, and T is a total number of sentences included in the $i^{th}$ group of dialog flows;

The second generation unit 632 is configured to calculate a value of a second term $v_j^{(i)}$ of the target function according to a probability at which each second decoder model outputs a second identifier $w_{jk}^{(i)}$ of a corresponding word in the sample sentence in response to inputting the sentence vector $$\sum_{i=1}^{N}\sum_{j=1}^{T}\sum_{k=1}^{M}p(w_{jk}^{(i)}\mid v_{j}^{(i)})$$

of the sample sentence, where M is a total number of words in the sample sentence; and The summation unit 633 is configured to sum the value of the first term and the value of the second term, to obtain the value of the target function.

The probability corresponding to the first identifier is obtained according to the first decoder models, the probability corresponding to the second identifier is obtained according to the second decoder models, and the value of the target function is determined, to reduce computing complexity.

Figure 8:
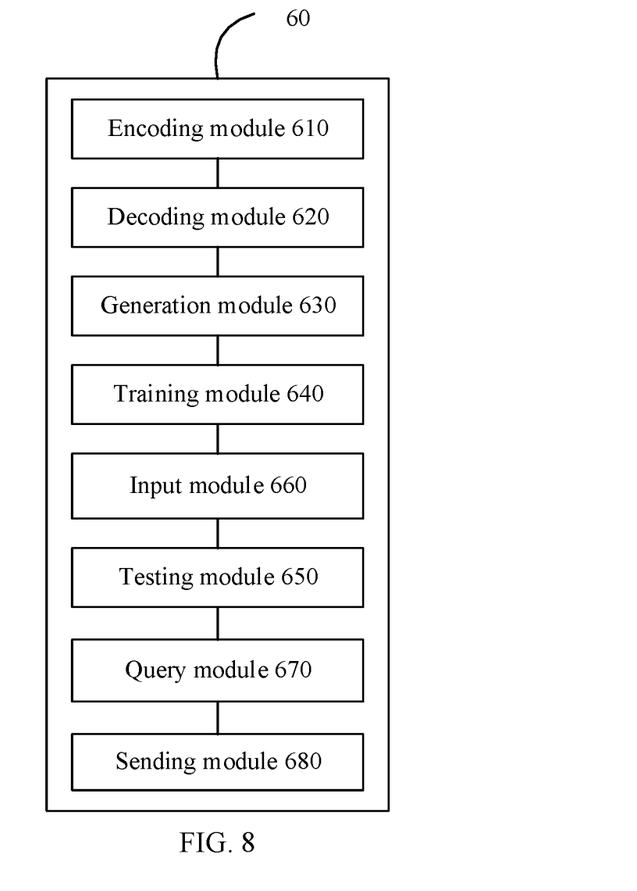
FIG. 8 is a schematic structural diagram of another semantic analysis apparatus according to an embodiment of the present disclosure.

Further to FIG. 6, in some embodiments of the present disclosure, as shown in FIG. 8, the semantic analysis apparatus 60 may further include an input module 660, a query module 670, and a sending module 680.

The input module 660 is configured to use a question inputted by a user end as the test sentence. The query module 670 is configured to query, according to the sentence vector of the test sentence, a question library to obtain a prestored question after the sentence vector representing semantics of the test sentence is obtained. The sending module 680 is configured to send an answer corresponding to the prestored question to the user end.

The question inputted by the user end is inputted into the encoder model as the test sentence, to obtain the sentence vector of the test sentence, and the prestored question similar to the sentence vector is obtained through query from the question library based on the sentence vector, and the answer corresponding to the prestored question is sent to the user end, thereby improving a matching degree between the answer and the question in a human-machine interaction process and improving user experience.

The foregoing explanations and descriptions for the semantic analysis method are also applied to the semantic analysis apparatus, and an implementation principle thereof is similar and is not described herein again.

In the semantic analysis apparatus, in one embodiment, for the sample sentence in a dialog flow, a word vector of each word in the sample sentence is inputted into an encoder model, to obtain a sentence vector representing semantics of the sample sentence; then the sentence vector of the sample sentence is inputted into a first decoder model corresponding to each context sentence, to obtain a first identifier corresponding to the context sentence; the sentence vector of the sample sentence is inputted into a second decoder model corresponding to each word of the sample sentence, to obtain a second identifier corresponding to the word; a probability corresponding to the first identifier is obtained according to the first decoder models, a probability corresponding to the second identifier is obtained according to the second decoder models, and a value of a target function is determined; then parameter training is performed on the encoder model according to the value of the target function; and a word vector of each word in a test sentence is inputted into the trained encoder model, to obtain a sentence vector representing semantics of the test sentence. Because in a training process, the first decoder model is used for predicting an identifier of the context sentence, only a calculation time length of a time step is needed. Compared with a manner in which each word in the sentence needs to be predicted, in a training process, a needed calculation time length is shortened, and time steps in the number of sentence lengths are shortened to one time step, resolving a technical problem of low semantic analysis efficiency caused by a long model training time length.

To implement the foregoing embodiments, the embodiments of the present disclosure further provide a computer device.

Figure 9:
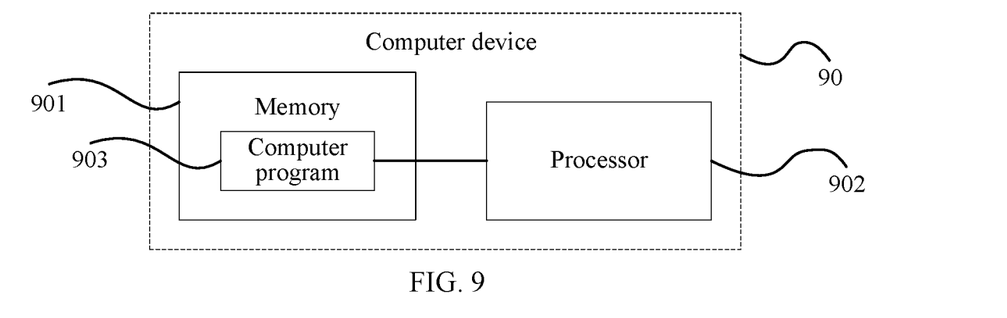
FIG. 9 is a schematic structural diagram of a computer device according to an embodiment of the present disclosure.

FIG. 9 is a schematic structural diagram of a computer device according to an embodiment of the present disclosure. As shown in FIG. 9, the computer device 90 includes a memory 901, a processor 902, and a computer program 903 stored on the memory 901 and capable of being run on the processor 902, when executing the computer program 903, the processor 902 implementing the semantic analysis method in the foregoing embodiments.

Further, embodiments of the present disclosure also provide a non-transitory computer-readable storage medium, storing a computer program thereon, the computer program implementing the semantic analysis method described in the foregoing embodiments when being executed by the processor.

In description of the present specification, description of reference terms such as "one embodiment", "some embodiments", "example", "specific example" or "some examples" means including specific features, structures, materials, or features described in the embodiment or example in at least one embodiment or example of the present disclosure. In this specification, schematic descriptions of the foregoing terms do not necessarily direct at a same embodiment or example. In addition, the described specific features, structures, materials, or features can be combined in a proper manner in any one or more embodiments or examples. In addition, in a case that is not mutually contradictory, a person skilled in the art can combine or group different embodiments or examples that are described in this specification and features of the different embodiments or examples.

In addition, terms "first" and "second" are only used to describe the objective and cannot be understood as indicating or implying relative importance or implying a number of the indicated technical features. Therefore, features defining "first" and "second" can explicitly or implicitly include at least one of the features. In description of the embodiments of the present disclosure, "multiple" means at least two, such as two and three unless it is specifically defined otherwise.

Any process or method description described in a flowchart or in another manner can be understood as a module, segment, or part representing codes including one or more executable instructions for implementing specific logical functions or steps of a process. In addition, a range of preferred implementations of the present disclosure include another implementation, and functions can be executed not according to the shown or discussed sequence, including according to a basically simultaneous manner according to involved functions or an opposite sequence, which should be understood by a person skilled in the art of the embodiments of the present invention.

The logic and/or steps shown in the flowcharts or described in any other manner herein, for example, a sequenced list that may be considered as executable instructions used for implementing logical functions, may be specifically implemented in any computer readable medium to be used by an instruction execution system, apparatus, or device (for example, a computer-based system, a system including a processor, or another system that can obtain an instruction from the instruction execution system, apparatus, or device and execute the instruction) or to be used by combining such instruction execution systems, apparatuses, or devices. In the present disclosure, the "computer readable medium" may be any apparatus that can include, store, communicate, propagate, or transmit programs to be used by the instruction execution system, apparatus or device or to be used in combination with the instruction execution system, apparatus or device. More specific examples (a non-exhaustive list) of the computer-readable medium include the following: an electrical connection (electronic apparatus) having one or more wires, a portable computer diskette (magnetic apparatus), a random access memory (RAM), a read-only memory (ROM), an erasable programmable read-only memory (EPROM or flash memory), an optical fiber apparatus, and a portable compact disk read-only memory (CDROM). In addition, the computer readable medium may even be a piece of paper for printing the program, or another proper medium, because, for example, optical scanning may be performed on the paper or another medium, and then processing is performed by performing editing and decryption, or in another proper manner to obtain the program in an electronic manner. Then the program is stored in a computer memory.

It should be understood that parts of the embodiments of the present disclosure can be implemented by hardware, software, firmware, or a combination thereof. In the foregoing implementations, a plurality of steps or methods may be implemented by using software or firmware that are stored in a memory and are executed by a proper instruction execution system. For example, if hardware is used for implementation, same as in another implementation, implementation may be performed by any one of the following technologies well known in the art or a combination thereof: a discrete logic circuit including a logic gate circuit for implementing a logic function of a data signal, a dedicated integrated circuit including a proper combined logic gate circuit, a programmable gate array (PGA), a field programmable gate array (FPGA), and the like.

A person of ordinary skill in the art may understand that all or some of the steps of the method embodiments may be implemented by a program instructing relevant hardware. The program may be stored in a computer-readable storage medium. When the program is run, one or a combination of the steps of the method embodiments are performed.

In addition, functional units in the embodiments of the present disclosure may be integrated into one processing module, or each of the units may exist alone physically, or two or more units are integrated into one module. The integrated module may be implemented in a hardware form, or may be implemented in a form of a software functional module. If implemented in the form of software functional modules and sold or used as an independent product, the integrated module may also be stored in a computer-readable storage medium.

The aforementioned storage medium may be a read-only memory, a magnetic disk, or an optical disc. Although the embodiments of the present disclosure are shown and described in the above, it can be understood that the foregoing embodiments are exemplary and cannot be construed as a limitation to the present disclosure. A person of ordinary skill in the art can change, modify, replace, and deform the foregoing embodiments within the scope of the embodiments of the present disclosure.

What is claimed is:

1. A semantic analysis method for a computer device, the method comprising:

inputting, for each sample sentence in a dialog flow, a word vector of each word in the sample sentence into an encoder model, to obtain a sentence vector representing semantics of the sample sentence, wherein the encoder model uses a convolutional neural network model and the sentence vector is outputted by the convolutional neural network model;

inputting the sentence vector of the sample sentence into a first decoder model corresponding to each context sentence of the sample sentence, to obtain a first identifier corresponding to the context sentence;

inputting the sentence vector of the sample sentence into a second decoder model corresponding to each word of the sample sentence, to obtain a second identifier corresponding to the word;

obtaining a first probability corresponding to the first identifier according to the first decoder model, obtaining a second probability corresponding to the second identifier according to the second decoder model, and determining a value of a target function, the value of the target function being used for indicating that the sentence vector of the sample sentence represents a semantic accuracy degree;

performing parameter training on a word vector matrix of the convolutional neural network model, a weight matrix of the convolutional neural network model, and a bias vector of the convolutional neural network model in the encoder model according to the value of the target function; and inputting a word vector of each word in a test sentence into the trained encoder model, to obtain a sentence vector representing semantics of the test sentence.

2. The semantic analysis method according to claim 1, wherein a word vector of a $k^{th}$ word of the sample sentence is $w_{jk}^{(i)} \cdot E_{encoder}$ and the sample sentence is a $j^{th}$ sentence in an $i^{th}$ group of dialog flows, and wherein $w_{jk}^{(i)}$ is an identifier of the $k^{th}$ word of the sample sentence, and $E_{encoder}$ is a word vector matrix of the convolutional neural network model.

3. The semantic analysis method according to claim 1, wherein the first decoder model and the second decoder model both use a deep neural network model; and the method further comprises:

performing parameter training on a weight matrix of the deep neural network model and a bias vector of the deep neural network model in the first decoder model and the second decoder model according to the value of the target function.

4. The semantic analysis method according to claim 1, wherein the obtaining a first probability corresponding to the first identifier according to the first decoder model, obtaining a second probability corresponding to the second identifier according to the second decoder model, and determining a value of a target function comprises:

calculating, while the sample sentence is an $j^{th}$ sentence in an $i^{th}$ group of dialog flows, a value of a first term $$\sum_{i=1}^{N}\sum_{j=1}^{T} p(s_{j-Q}^{(i)}, \ldots, s_{j-1}^{(i)}, s_{j+1}^{(i)}, \ldots, s_{j+Q}^{(i)} | v_j^{(i)})$$

of the target function according to a probability at which each first decoder model outputs a first identifier $s_{j\pm q}^{(i)}$ corresponding to a context sentence in response to inputting a sentence vector $v_j^{(i)}$ of the sample sentence, wherein q=1, 2, . . . , Q, N is a total number of groups of dialog flows, and T is a total number of sentences comprised in the $i^{th}$ group of dialog flows;

calculating a value of a second term $$\sum_{i=1}^{N}\sum_{j=1}^{T}\sum_{k=1}^{M} p(w_{jk}^{(i)} \mid v_j^{(i)})$$

of the target function according to a probability at which each second decoder model outputs a second identifier $w_{jk}^{(i)}$ corresponding to a word in the sample sentence in response to inputting the sentence vector $v_j^{(i)}$ of the sample sentence, wherein M is a total number of words in the sample sentence; and summing the value of the first term and the value of the second term, to obtain the value of the target function.

5. The semantic analysis method according to claim 1, wherein the method further comprises:

using a question inputted by a user end as the test sentence; and querying, according to the sentence vector of the test sentence, a question library to obtain a prestored question; and sending an answer corresponding to the prestored question to the user end.

6. The method according to claim 1, wherein the first decoder model and the second decoder model perform calculations in parallel to each other.

7. A semantic analysis apparatus, comprising: a memory storing computer program instructions; and a processor coupled to the memory and, when executing the computer program instructions, configured to perform:

inputting, for each sample sentence in a dialog flow, a word vector of each word in the sample sentence into an encoder model, to obtain a sentence vector representing semantics of the sample sentence, wherein the encoder model uses a convolutional neural network model and the sentence vector is outputted by the convolutional neural network model;

inputting the sentence vector of the sample sentence into a first decoder model corresponding to each context sentence of the sample sentence, to obtain a first identifier corresponding to the context sentence;

inputting the sentence vector of the sample sentence into a second decoder model corresponding to each word of the sample sentence, to obtain a second identifier corresponding to the word;

obtaining a first probability corresponding to the first identifier according to the first decoder model, obtaining a second probability corresponding to the second identifier according to the second decoder model, and determining a value of a target function, the value of the target function being used for indicating that the sentence vector of the sample sentence represents a semantic accuracy degree;

performing parameter training on a word vector matrix of the convolutional neural network model, a weight matrix of the convolutional neural network model, and a bias vector of the convolutional neural network model in the encoder model according to the value of the target function; and inputting a word vector of each word in a test sentence into the trained encoder model, to obtain a sentence vector representing semantics of the test sentence.

8. The semantic analysis apparatus according to claim 7, wherein a word vector of a $k^{th}$ word of the sample sentence is $w_{jk}^{(i)} \cdot E_{encoder}$ and the sample sentence is a $j^{th}$ sentence in an $i^{th}$ group of dialog flows, wherein $w_{jk}^{(i)}$ is an identifier of the $k^{th}$ word of the sample sentence, and $E_{encoder}$ is a word vector matrix of the convolutional neural network model.

9. The semantic analysis apparatus according to claim 7, wherein the first decoder model and the second decoder model both use a deep neural network model;

and the processor is further configured to perform:

performing parameter training on a weight matrix of the deep neural network model and a bias vector of the deep neural network model in the first decoder model and the second decoder model according to the value of the target function.

10. The semantic analysis apparatus according to claim 7, wherein the obtaining a first probability corresponding to the first identifier according to the first decoder model, obtaining a second probability corresponding to the second identifier according to the second decoder model, and determining a value of a target function comprises:

calculating, while the sample sentence is an $j^{th}$ sentence in an $i^{th}$ group of dialog flows, a value of a first term $$\sum_{i=1}^{N}\sum_{j=1}^{T} p(s_{j-Q}^{(i)}, \ldots , s_{j-1}^{(i)}, s_{j+1}^{(i)}, \ldots , s_{j+Q}^{(i)} \mid v_j^{(i)})$$

of the target function according to a probability at which each first decoder model outputs a first identifier $s_{j\pm q}^{(i)}$ corresponding to a context sentence in response to inputting a sentence vector $v_j^{(i)}$ of the sample sentence, wherein q=1, 2, . . . , Q, N is a total number of groups of dialog flows, and T is a total number of sentences comprised in the $i^{th}$ group of dialog flows;

calculating a value of a second term $$\sum_{i=1}^{N}\sum_{j=1}^{T}\sum_{k=1}^{M} p(w_{jk}^{(i)} \mid v_j^{(i)})$$

of the target function according to a probability at which each second decoder model outputs a second identifier $w_{jk}^{(i)}$ corresponding to a word in the sample sentence in response to inputting the sentence vector $v_j^{(i)}$ of the sample sentence, wherein M is a total number of words in the sample sentence; and summing the value of the first term and the value of the second term, to obtain the value of the target function.

11. The semantic analysis apparatus according to claim 7, wherein using a question inputted by a user end as the test sentence; and querying, according to the sentence vector of the test sentence, a question library to obtain a prestored question; and sending an answer corresponding to the prestored question to the user end.

12. A non-transitory computer-readable storage medium storing computer program instructions executable by at least one processor to perform:

inputting, for each sample sentence in a dialog flow, a word vector of each word in the sample sentence into an encoder model, to obtain a sentence vector representing semantics of the sample sentence, wherein the encoder model uses a convolutional neural network model and the sentence vector is outputted by the convolutional neural network model;

inputting the sentence vector of the sample sentence into a first decoder model corresponding to each context sentence of the sample sentence, to obtain a first identifier corresponding to the context sentence;

inputting the sentence vector of the sample sentence into a second decoder model corresponding to each word of the sample sentence, to obtain a second identifier corresponding to the word;

obtaining a first probability corresponding to the first identifier according to the first decoder model, obtaining a second probability corresponding to the second identifier according to the second decoder model, and determining a value of a target function, the value of the target function being used for indicating that the sentence vector of the sample sentence represents a semantic accuracy degree;

performing parameter training on a word vector matrix of the convolutional neural network model, a weight matrix of the convolutional neural network model, and a bias vector of the convolutional neural network model in the encoder model according to the value of the target function; and inputting a word vector of each word in a test sentence into the trained encoder model, to obtain a sentence vector representing semantics of the test sentence.

13. The non-transitory computer-readable storage medium according to claim 12, wherein a word vector of a $k^{th}$ word of the sample sentence is $w_{jk}^{i} \cdot E_{encoder}$ and the sample sentence is a $j^{th}$ sentence in an $i^{th}$ group of dialog flows, wherein $w_{jk}^{(i)}$ is an identifier of the $k^{th}$ word of the sample sentence, and $E_{encoder}$ is a word vector matrix of the convolutional neural network model.

14. The non-transitory computer-readable storage medium according to claim 12, wherein the first decoder model and the second decoder model both use a deep neural network model;

and the computer program instructions are executable by the processor to further perform:

performing parameter training on a weight matrix of the deep neural network model and a bias vector of the deep neural network model in the first decoder model and the second decoder model according to the value of the target function.

15. The non-transitory computer-readable storage medium according to claim 12, wherein the obtaining a first probability corresponding to the first identifier according to the first decoder model, obtaining a second probability corresponding to the second identifier according to the second decoder model, and determining a value of a target function comprises:

calculating, the sample sentence is an $j^{th}$ sentence in an $i^{th}$ group of dialog flows, a value of a first term $$\sum_{i=1}^{N} \sum_{j=1}^{T} p(s_{j-Q}^{(i)}, \ldots, s_{j-1}^{(i)}, s_{j+1}^{(i)}, \ldots, s_{j+Q}^{(i)} | v_{j}^{(i)})$$

of the target function according to a probability at which each first decoder model outputs a first identifier $s_{j\pm q}^{(i)}$ corresponding to a context sentence in response to inputting a sentence vector $v_{j}^{(i)}$ of the sample sentence, wherein q=1, 2, . . . , Q, N is a total number of groups of dialog flows, and T is a total number of sentences comprised in the $i^{th}$ group of dialog flows;

calculating a value of a second term $$\sum_{i=1}^{N} \sum_{j=1}^{T} \sum_{k=1}^{M} p(w_{jk}^{(i)} | v_{j}^{(i)})$$

of the target function according to a probability at which each second decoder model outputs a second identifier $w_{jk}^{(i)}$ corresponding to a word in the sample sentence in response to inputting the sentence vector $v_{j}^{(i)}$ of the sample sentence, wherein M is a total number of words in the sample sentence; and summing the value of the first term and the value of the second term, to obtain the value of the target function.

16. The non-transitory computer-readable storage medium according to claim 12, wherein the computer program instructions are executable by the processor to further perform:

using a question inputted by a user end as the test sentence; and querying, according to the sentence vector of the test sentence, a question library to obtain a prestored question; and sending an answer corresponding to the prestored question to the user end.

* * * * *